United States Patent
Cromer et al.

(10) Patent No.: US 7,366,304 B2
(45) Date of Patent: *Apr. 29, 2008

(54) CRUABLE U-NII WIRELESS RADIO WITH SECURE, INTEGRAL ANTENNA CONNECTION VIA SM BIOS IN U-NII WIRELESS READY DEVICE

(75) Inventors: Daryl Carvis Cromer, Apex, NC (US); Kazuo Fujii, Kanagawa (JP); Ronald John Griffiths, Jr., Raleigh, NC (US); Masaharu Itoh, Yamato (JP); Philip John Jakes, Durham, NC (US); Kozo Matsunaga, Kanagawa (JP); Masaki Oie, Machida (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 930 days.

This patent is subject to a terminal disclaimer.

(21) Appl. No.: 10/681,006

(22) Filed: Oct. 7, 2003

(65) Prior Publication Data

US 2005/0074123 A1 Apr. 7, 2005

(51) Int. Cl.
*H04K 1/00* (2006.01)
*G06F 11/00* (2006.01)
*G06F 9/00* (2006.01)

(52) U.S. Cl. .............. 380/270; 276/2; 276/4; 276/6; 276/34; 276/35; 276/36; 713/171; 713/192; 713/193; 713/194; 713/1; 713/2; 380/277; 455/90; 455/450; 455/562.1; 455/557; 343/702

(58) Field of Classification Search ........... 726/34, 726/35, 36
See application file for complete search history.

(56) References Cited

U.S. PATENT DOCUMENTS 5,708,833 A * 1/1998 Kinney et al. ............. 710/301
5,818,939 A * 10/1998 Davis ........................ 713/192
5,991,864 A * 11/1999 Kinney et al. ................ 712/1

(Continued)

FOREIGN PATENT DOCUMENTS

EP  1 083 622 A2  3/2001

(Continued)

*Primary Examiner*—Ayaz Sheikh
*Assistant Examiner*—Jenise E. Jackson
(74) *Attorney, Agent, or Firm*—Carlos Nunoz-Bustamante; Dillon & Yudell LLP

(57) ABSTRACT

A method that utilizes software and hardware mechanisms to meet the FCC requirement for a U-NII antenna to be an integral part of the device in which it operates, while providing wireless ready U-NII devices and CRUable U-NII radios. Enhancements are made to the software BIOS, including the inclusion of a table of approved radio-antenna PCI ID pairs to create an authentication scheme that verifies and authenticates the radio and antenna combination as being an FCC-approved unique coupling during boot-up of the system. The BIOS also comprises an OEM field that stores an encrypted secret key utilized to complete a second check of the radio model placed in the device. During boot up of the device, the PCI ID pairs from the BIOS are compared against the PCI ID of the radio and the secret key is checked against the radio model. Only a system with an approved combination of radio and antenna is allowed to complete the boot process, indicating an FCC approved device-antenna-radio combination under the "integral" requirement.

25 Claims, 5 Drawing Sheets

U.S. PATENT DOCUMENTS

| | | | |
|---|---|---|---|
| 6,011,483 A * | 1/2000 | Tanaka et al. | 340/10.33 |
| 6,404,393 B1 | 6/2002 | Nelson et al. | |
| 6,509,877 B2 | 1/2003 | Masaki | |
| 6,531,985 B1 | 3/2003 | Jones et al. | |
| 6,577,500 B2 * | 6/2003 | Paredes et al. | 361/686 |
| 6,845,450 B1 * | 1/2005 | Kobayashi et al. | 726/5 |
| 2001/0006902 A1 | 7/2001 | Ito | |
| 2001/0026243 A1 * | 10/2001 | Koitsalu et al. | 343/860 |
| 2002/0137472 A1 * | 9/2002 | Quinn et al. | 455/90 |
| 2002/0164963 A1 | 11/2002 | Tehrani et al. | |
| 2002/0176366 A1 | 11/2002 | Ayyagari et al. | |
| 2002/0183013 A1 | 12/2002 | Auckland et al. | |
| 2003/0043078 A1 | 3/2003 | Deng et al. | |
| 2003/0050032 A1 | 3/2003 | Masaki | |
| 2003/0088777 A1 * | 5/2003 | Bae et al. | 713/181 |
| 2003/0220126 A1 * | 11/2003 | Fujii et al. | 455/550.1 |
| 2004/0174307 A1 * | 9/2004 | Kinney et al. | 343/702 |
| 2005/0027908 A1 * | 2/2005 | Ong et al. | 710/62 |

FOREIGN PATENT DOCUMENTS

EP          1 294 048 A2     3/2003

\* cited by examiner

CRUABLE U-NII WIRELESS RADIO WITH SECURE, INTEGRAL ANTENNA CONNECTION VIA SM BIOS IN U-NII WIRELESS READY DEVICE

RELATED APPLICATIONS

The present invention is related to the subject matter of the following commonly assigned, co-pending U.S. patent applications: Ser. No. 10/680,977 entitled "CRUABLE U-NII WIRELESS RADIO WITH SECURE, INTEGRAL ANTENNA CONNECTION VIA VALIDATION REGISTERS IN U-NII WIRELESS READY DEVICE" and filed Oct. 7, 2003; and Ser. No. 10/680,974 entitled "CRUABLE DUAL MODE U-NIL WIRELESS RADIO WITH SECURE, INTEGRAL ANTENNA CONNECTION IN U-NII WIRELESS READY DEVICE" and filed Oct. 7, 2003. The content of the above-referenced applications is incorporated herein by reference.

BACKGROUND OF THE INVENTION

1. Technical Field

The present invention relates generally to wireless communication devices and in particular to wireless communication devices utilized in computer systems. Still more particularly, the present invention relates to customer installable and replaceable U-NII wireless cards utilized in computer systems.

2. Description of the Related Art

Computer-based wireless communication devices, including wireless LANs and wireless ready systems, is a quickly emerging and evolving technology. Conventional computer-based wireless communication devices transmit radio frequency (RF) signals to wireless receivers of local area networks (LANs). These devices include transmitters that both transmit and receive wireless communication within a particular bandwidth in the highly regulated RF spectrum.

The RF spectrum is a limited bandwidth spectrum that is allocated among a number of different services types/applications, including military, aviation, broadcast, and commercial communications. Because of the very limited bandwidth available within the radio frequency (RF) spectrum, transmission in this medium is subject to strict government regulations. The regulations typically cover to the type and parameters of the transmitters being utilized in a wireless network. These regulations cover modulation scheme, frequency of operation, and transmit power of the transmitters in order to avoid interference among the various authorized services utilizing the RF spectrum.

Transmitters comprise a combination of a circuit module called a radio coupled to an antenna. The antenna is a central part of the transmitter since the antenna is designed and tuned to optimize gain or attenuation for desired frequencies. Conventionally, manufacturers of transmitters obtain a license from the government authorizing the manufacturer to manufacture a particular type of transmitter, exhibiting particular parameters. The license covers both components of the transmitter unit (i.e., radio and antenna), and the license typically specifies exact protocols (i.e., operating parameters or ranges of parameters) for both components and the combination device. In the United States, for example, licenses are granted and regulated by the Federal Communication Commission (FCC). Also, the regulations require that the end users not be able to change or reconfigure the transmitter, which would result in operation outside of the authorized parameters. Any change made to the operating parameters radio or antenna requires another application for license and authorization by the FCC.

Conventional wireless computer networks are provided two frequency ranges with defined protocols to support wireless operations. These protocols are the 802.11b and 802.11g protocols, operating at ISM band for 2.4 GHz, and the U-NII HiperLAN/2 and other protocols, operating at U-NII for 5 GHz. With the strict government regulations, it is essential that manufacturers and users of Wireless Fidelity (WiFi) LAN components ensure that the wireless component is operating within authorized parameters (i.e., power, roll off, etc. as defined by specification) provided by the ISM band for 2.4 GHz and U-NII for 5 GHz ranges. It is also essential for the components to be designed to prevent tampering or modification by the end users, which would change the operating parameters of the transmitter.

To obtain authorization for the transmitter, manufacturers implement design and manufacturing controls to ensure that the transmitter complies with the regulatory requirements. For example, the regulation of transmitters operating with the ISM 2.4 GHz band requires a unique connection between the radio and antenna. To satisfy this requirement, the manufacturers designed a unique connector. International Business Machines Corporation, for example, selected a reverse thread connection for its low profile peripheral component interconnect (PCI) Card. That company also implemented a method referred to as BIOS Lock, which is described below to ensure compliance with the FCC's ISM 2.4 GHz band regulations.

Maintaining tight coupling between the radio and antenna in desktop personal computer or with PCMCIA cards is straightforward, since transmitters (radio and antenna) are typically packaged as a single unit within the casing of the card. However, maintaining tight coupling for devices imbedded in notebook-type computer systems is much more complicated because the antenna is integrated into the lid portion or cover (i.e., within the external plastic or composite shell covering the top portion) of the portable computer system, while the radio is typically a mPCI (mini peripheral component interconnect) card inserted into the lower portion (i.e., the base/chassis) of the portable computer system. In the portable computer environment, the transmitter is assembled by inserting the wireless PCI card into an mPCI slot and attaching the radio to the antenna via coax cable leading to the antenna imbedded in the lid portion.

Since there are a variety of suppliers of 802.11b mPCI (ISM 2.4 Ghz band) cards available on the market, the manufacturers of the notebook computer systems have to implement ways to ensure that the FCC regulations are complied with. That is, the manufacturer must design the computer system with a built in mechanism to prevent unauthorized 802.11b cards from being utilized with the antenna built in to the computer system's cover. Different manufacturers provide different methods of handling this potential problem. IBM, for example, currently implements a method referred to as BIOS (basic input/output system) Lock, which is described below.

Conventional 802.11b mPCI cards are inserted into the computer system before the computer system is powered on, and as such, BIOS Lock occurs during boot-up of the computer system. During boot, power-on self test (POST) checks the PCI IDs of the mPCI card and compares it to authorized cards for that computer system. If the BIOS detects an unauthorized card, the BIOS will prevent boot of the system. This method allows the manufacturer to enable a system to accept several different 802.11b WiFi cards from different suppliers. This approach also enables wireless-ready systems, where the computer system is shipped with the antenna embedded in the cover and the end user is able to install one of the authorized 802.11b WiFi mPCI radio cards.

Unlike the FCC regulation of its 802.11b (ISM 2.4 GHz band) counterpart, the FCC's regulation of transmitters operating with the 802.11a (U-NII/5 GHz band) protocol requires that: "Any U-NII device that operates in the 5.15-5.25 GHz band shall use a transmitting antenna that is an integral part of the device." (FCC regulation Part 15.407d). This restrictive requirement presents a challenge for integrating U-NII wireless LAN (WLAN) devices such as an U-NII wireless card in a mobile PC, which is designed with an antenna subsystem separate from the feature card implementing specific WLAN function. The BIOS Lock method for 802.11b (ISM 2.4 GHz band) is not stringent enough and does not meet this FCC standard of "integral part of the device".

Conventional methods provided as solutions to the "integral part of the device" requirements either (1) solder (or otherwise permanently attach) antenna leads to the WLAN feature card, or (2) permanently "bury" the feature card inside the mobile PC behind tamper-proof screws or other such mechanisms. Both approaches are not ideal because of serviceability issues, manufacturability issues, and additional costs. More importantly, the permanence of the placement of the card eliminates the ability to provide U-NII-based cards as an after-market upgrade that is customer installable, as is currently possible with 802.11b cards. The Tamper Proof Screw, introduced by IBM is one hardware implementation that has received approval by the FCC for U-NII-based machines.

The PC industry has a long tradition of providing flexibility and expandability. Manufacturers, such as IBM, are extending this tradition to the wireless arena, and are now building substantially all laptops with integrated antennas. With the 802.11b (ISM 2.4 GHz standard, for example, the user can order a card at time of purchase, add wireless, or change wireless cards in the future. This functionality, particularly the adding and/or replacing of the wireless card after purchasing the computer system, has led to the generation of customer replaceable unit (CRUable) wireless devices in the 802.11b arena.

Currently, the 802.11b radio is widely deployed in corporate enterprises and in public hot spots, such as hotels, airports, etc. Recently, manufacturers have began to deploy the higher performance 802.11a (U-NII) radio in corporate infrastructures where additional performance and capacity is critical. The difference in functional characteristics and cost of the two radios (i.e., the transmitter types) results in a different market (and/or user) for computer systems designed to support one of the two types of radio. Naturally, because of the above described regulations, computer systems supporting the 802.11a (U-NII 5 GHz) standard requires the U-NII radio be built in to and shipped/sold with the computer system, while the radios for computers supporting the 802.11b standard may often be provided after-market, as a separate user-replaceable component.

Because of the differences in users, operating parameters/ restrictions, and customer demands, manufacturers conventionally manufacture single-mode wireless 802.11b cards with a radio or a combo card that contains both an 802.11b radio and separate U-NII radio. The combo (U-NII & ISM) cards are installed in the computer systems connected to the antenna with tamper proof mechanisms in order to satisfy the FCC's "integral" requirement. 802.11a/b combo cards or single function U-NII radios are not sold as a separate after-market product.

The present invention recognizes the limitations with implementing U-NII-based wireless computer systems, as well as the limitation of not enabling after-market upgrades of cards. The invention further recognizes that it would be desirable to provide mechanisms that meet the "integral part of the device" requirement for the U-NII antenna connection, but still allows for serviceability and after-market replacement or addition. These and other benefits are provided by the invention described herein.

SUMMARY OF THE INVENTION

Disclosed is a method and system that utilizes software to meet the FCC requirement for an U-NII antenna to be an integral part of the device in which it operates, while providing wireless ready U-NII devices and Customer Replaceable Units (CRUable) U-NII radios. The device comprises the antenna, an interface slot, a coax connector slot and coax coupling the connector slot to the antenna, and a basic input/output system (BIOS). The device's BIOS is enhanced to include a table of authorized/approved radio-antenna pairs for the device. Additionally, the BIOS includes comparator logic, and a security mechanism (key) to prevent unauthorized modification of the table parameters. The CRUable U-NII radio is fabricated on a wireless module that also comprises an interface for connecting to the interface slot of the device, as well as an EEPROM with a register storing a radio identifier (radioID) imprinted in the EEPROM's register by the manufacturer.

The software-based authentication process is completed as a radio-to-device authentication process. During boot up of the device, the radioID is compared against the radio-antenna pairs within the table in the device's BIOS. The comparison first selects the correct radio-antenna pair based on the ID of the antenna embedded within the device. The security key provides access to the table and points to the correct radio for the device and antenna. U-NII transmission capability of the device and radio is enabled only when the radioID and the ID of the approved radio from the table of radio-antenna pair matches, indicating FCC approved device-antenna-radio combination under the "integral" requirement.

In one embodiment, the boot process is allowed to continue only when the radioIDs match. Otherwise the boot process is terminated. In another embodiment, the boot process is allowed to proceed but the radio is disabled from operating within the device, so that the device boots without U-NII transmission capability. The invention thus allows the manufacture of both wireless-ready U-NII computer systems and approved CRUable U-NII radios by uncoupling the radio and antenna, while ensuring that the combination of system-antenna-radio would meet the FCC integral standards for antennas and transmitters operating with that protocol.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1A:
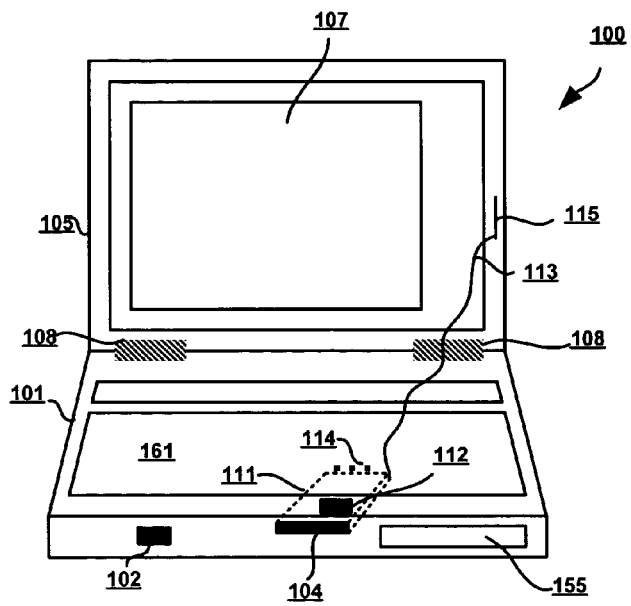
FIG. 1A is a block diagram generally illustrating the base and display portions of an exemplary laptop computer system within which the features of the invention may be implemented.

The present invention provides a software-implemented authentication procedure that enables a computer system designed with an embedded U-NII-standard antenna to accommodate a CRUable wireless card while fulfilling the FCC's "integral" requirements. The invention satisfies the integral requirement for devices of U-NII wireless transmitters utilizing specific authentication processes implemented by code within system software, specifically the system BIOS. The BIOS is utilized during boot up to ensure unique, FCC-approved coupling of system-antenna-radio before allowing the radio to be operational within the system. That is, the BIOS is uniquely coded for the particular chassis and antenna of the system/device within which it is located. A software only solution is important because the solution can be utilized with existing hardware and is easily implemented on any wireless offering made by the manufacturer.

The unique coupling via software allows the radio to be sold separately and later installed into the computer system having a correct antenna, while still meeting the regulatory requirements for unique coupling. The invention thus provides a CRUable wireless card for U-NII that is authenticated during the boot process via a software-directed scheme. The CRUable card is provided with an EEPROM that contains the radio identifier (radioID) programmed into the EEPROM by the manufacturer and utilized to complete the authentication process that ensures that only the unique coupling will enable U-NII transmission capabilities within the system. The functional use of the radioID is described in further detail below in the description of FIGS. 3A and 4. Also, the invention is described generally with reference to ISM and U-NII devices/radios; however, for illustrative purposes, several references are made to an 802.11b ISM 2 GHz device/radio and an 802.11a U-NII 5 GHz radio/device.

In the described embodiment, the software implemented scheme involves the interaction of parameter of the module, the radioID and the system BIOS to complete the authentication process. In the described embodiment utilizing the software-directed authentication scheme of the present invention, a computer system designed (with embedded antenna) to operate with the U-NII wireless protocol is prevented from being powered up for use without an absolute validation/authenticated of the radio and antenna combination.

Notably, as will become clear in the described embodiments, the various implementations of the invention are significantly different from BIOS Lock currently implemented for 802.11b (2.4 GHz) operation. The BIOS Lock prevents the system from booting up with un-approved radios, but does not prevent the radio from working in an un-approved system. For example, one is able to take an 802.11b radio and it installs the radio in another notebook without BIOS Lock, and the radio would be connected to the antenna in that chassis and fully functional. However, for U-NII (5 GHz) systems such as an 802.11a transmitter, this would probably create an unauthorized or illegal configuration under FCC regulations. The present invention overcomes this potential problem since the invention ensures both that the system will only accept approved radios and that the radio will only transmit in approved systems.

Since the radio is only functional when placed in a specific chassis that contains the correct antenna, the problems/concerns that led to the strict FCC integral regulation are eliminated, without having to hardwire the antenna and radio within the system during manufacture. The antenna and radio combination when coupled together and authenticated via the method provided by the present invention meets the FCC requirement for "integral part of the device" and is thus a legally approved combination.

Figure 1B:
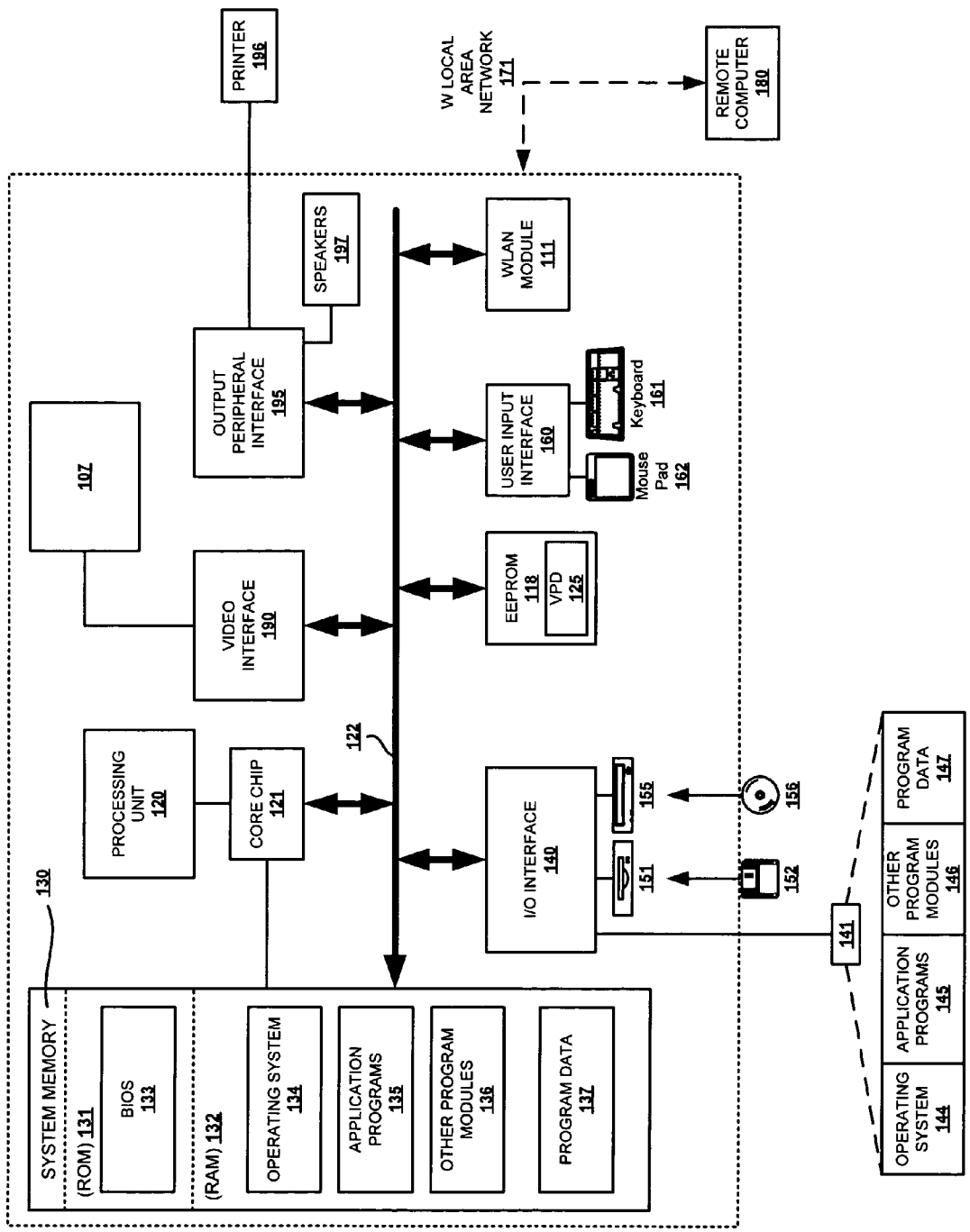
FIG. 1B is a block diagram depicting the internal components of the exemplary laptop computer of FIG. 1A, including some software components utilized in accordance with one embodiment of the invention.

Referring now to the figures, and in particular to FIGS. 1A and 1B, there are respectively illustrated an example of a wireless ready laptop computer and a computing system environment 100 within which the invention may be implemented. To simplify the description of the invention, the computing system environment is assumed to be an internal view of the laptop system described in FIG. 1A and thus share reference numerals. The laptop system and computing system environment are provided as an example and is not intended to suggest any limitation as to the scope of use or functionality of the invention. Neither should the computing environment be interpreted as having any dependency or requirement relating to any one or combination of components illustrated in the exemplary system environment.

Thus, the invention is operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

FIG. 1A illustrates an exemplary laptop computer system configured for wireless communication (also referred to as a wireless-ready laptop computer system). Laptop computer 100 comprises base unit (or chassis) 101 having internal components and an external housing with an upper surface, a lower surface, side walls, etc. The laptop computer 100 also comprises a lid portion or cover 105 that includes display unit 107. Lid portion 105 is attached to the base unit 101 via some form of hinge mechanism 108. In the illustrative embodiment, display unit includes a screen 107 and external housing. Lid portion 105 also comprises an embedded antenna 115 with an attached co-ax cable 113 running from antenna 115 through the hinge 108 into the base unit 101. The antenna 115 is hidden/embedded behind the lid cover/shell and is thus referred to as an embedded antenna. Also, according to the invention, the antenna has a unique ID, which is known by the BIOS of the computer system. The antenna 115 may be designed to support both 2.4 GHz band and 5 GHz band operations.

Base unit 101 also comprises an on/off button 102 by which power to the internal components are turned on and off and a CD ROM (optical) drive 155 for receiving an optical recording medium. Within the base unit 101 is a mother board (not shown) on which the functional components of the laptop computer such as the processor, memory, etc., are built/installed. Also contained in the mother board is an mPCI connector (illustrated as dots 114), which accepts mPCI cards 111, such as U-NII wireless cards, 802.11b wireless cards, or 801.11a/b wireless combo cards. Access to the mPCI slot is obtained either by opening an access panel 104 (on the bottom of chassis unit 101) or by lifting keyboard 161. Although described with specific reference to mPCI cards and associated mPCI slots, those skilled in the art would appreciate that the features of the present invention may be applicable to other types of port/connection schemes and CRUable cards.

Figure 2:
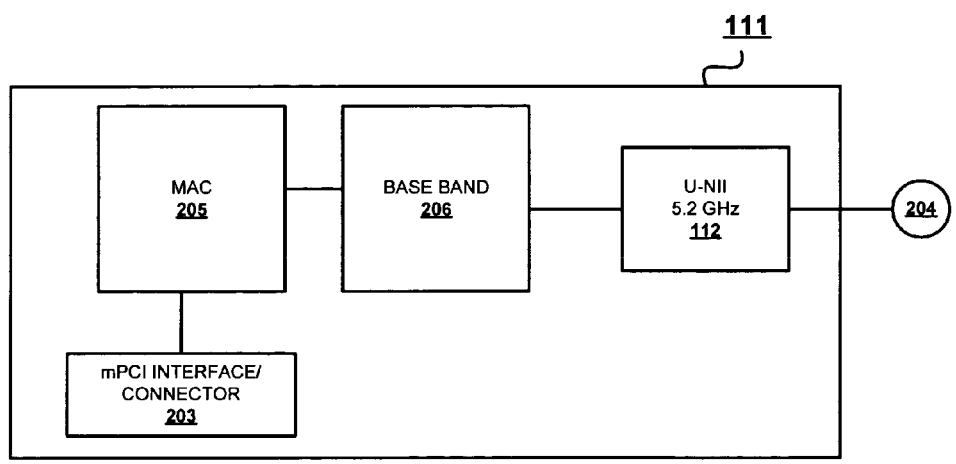
FIG. 2 depicts an exemplary CRUable wireless module with an U-NII radio according to one implementation of the present invention.

As will be explained in greater details below, an access panel 104 enables an insertion of a wireless card/module 111, such as is shown in FIG. 2, into the mPCI connector 114 located behind the access panel 104. The interfaces are electrical connectors that received interlocking connectors from the wireless mPCI card 111. Wireless card 111 has a connection interface for mPCI bus signal interface, which connects to mPCI connector 114 on the mother board. One electrical connector illustrated in FIG. 1A serves to electrically couple the radio 112 of the wireless mPCI card 111 to the antenna 115, via micro-coaxial cables 113.

Turning briefly to FIG. 2, wireless mPCI card 111 comprises wireless U-NII (5 GHz) radio 112 (e.g., an 802.11a radio), a BaseBand 206, and a media access controller (MAC) 205. The wireless mPCI card 111 also contains an antenna interface 204 that provides a cable connector to the radio 112 for micro-coaxial cable 113 to complete external coupling and interaction with antenna 115. As described in FIG. 1A, antenna 115 may be integrated within the lid portion of the laptop 100 and connected via micro-coaxial cable 113 to the U-NII radio 112 on mPCI card 111. Wireless mPCI card 111 also comprises an mPCI interface/connector 203 that interfaces with the processor and other components on the mother board via mPCI connector 114. Other connectors provided on mPCI include power interface (not shown) for providing wireless mPCI card 111 with electrical power when wireless mPCI card 111 is connected within laptop 100 via mPCI connector 114. Wireless mPCI card 111 may also comprise a power regulator and preamplifier, as well as other components, none of which are relevant to the invention and therefore not illustrated herein.

With specific reference to FIG. 1B, there is illustrated an exemplary general purpose computing device, which for purposes of simplification is assumed to be wireless ready laptop computer 100. Computer 100 comprises, but is not limited to, a processing unit 120, which is connected by local bus to core chip 121. Core chip 121 is also connected to system memory 130, and a system bus 122. The system bus 122 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus.

The system memory 130 includes computer storage media in the form of volatile and/or nonvolatile memory such as read only memory (ROM) 131 and random access memory (RAM) 132. For purposes of the invention, computer 100 further comprises an EEPROM 118, connected to the system bus 122, and which contains validation registers (VR) 125. A basic input/output system (BIOS) 133, containing the basic routines that help to transfer information between elements within computer 100, such as during boot-up, is typically stored in ROM 131. RAM 132 typically contains data and/or program modules that are immediately accessible to and/or presently being operated on by processing unit 120. By way of example, and not limitation, the program modules include operating system (OS) 134, application programs 135, other program modules 136, and program data 137.

The computer 100 may also include other removable/non-removable, volatile/nonvolatile computer storage media. By way of example only, FIG. 1B illustrates a hard disk drive 141, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

I/O Interface 140, connects hard disk drive 141, magnetic disk drive 151, and optical disk drive 155 to the system bus 122. The drives and their associated computer storage media discussed above and illustrated in FIG. 1B provide storage of computer readable instructions, data structures, program modules and other data for the computer 100. For example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 100 through input devices such as a keyboard 161 and an integrated pointing device 162 (e.g., a track point or track pad), commonly referred to as a touch pad. These and other input devices are integrated into chassis 101 and are often connected to the processing unit 120 through a user input interface 160 that is coupled to the system bus 122, but may be connected by other interface and bus structures, such as a parallel port, game port or a universal serial bus (USB). A LCD panel 107 (integrated into lid 105) is also connected to the system bus 122 via an interface, such as a video interface 190. In addition to the monitor, computers may also include other peripheral output devices such as speakers 197 and printer 196, which may be connected through an output peripheral interface 195.

The computer 100 may operate in a networked environment using logical connections to one or more remote computers, such as a remote computer 180. The remote computer 180 may be another personal computer, a server, a router, a network PC, a peer device or other common network node, and typically includes many or all of the elements described above relative to the computer 100. When used in a WLAN networking environment, the computer 100 is connected to the WLAN 171 through a WLAN network interface or wireless module 111. The connection to the networked remote computer 180 is facilitated by WLAN module 111, which connects via wireless transmission to other components in WLAN 171. WLAN module 111 connects to system bus 122 via an mPCI connector 114. Computer 100 may also be connected via wired LAN and/or the Internet via other connection modules such as a modem.

The invention operates within a communication device (e.g., the laptop computer system 100 of FIGS. 1A and 1B) with which FCC authorized radio-antenna coupling is required for U-NII communication. The computer system is provided to a user with an U-NII approved antenna embedded within the lid or other location that is made relatively inaccessible to the user or difficult to modify/replace without manufacturer authorized support. This prevents the antenna from being tampered with. Also, each embedded antenna has a unique ID, which identifies the antenna as an U-NII antenna that may be utilized to receive and issue wireless transmissions within the particular computer system. Finally, according to the invention, the particular device and antenna together provide specific identifying characteristics required by any combination of radio and antenna coupling that is to be utilized for wireless communication via the U-NII protocol.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Because most of the implementation of the invention occurs within portable computer systems, such as laptop computer system 100, the remainder of the invention will be described with specific reference to a computer system and software and hardware components thereof. As previously described, the antenna is imbedded in the system lid, which is permanently connected to the chassis, in which the mother board having the CPU and System BIOS, and mPCI slot for connecting the CRUable mPCI card is located. A permanent connection between the system lid, which contains the antenna, and the system chassis is made via the hinges. The mother board/system board has a permanent connection to the chassis and contains BIOS unique to that mother board/chassis/system and lid configuration. The permanent connections allow the combination of antenna, mother board, and BIOS to be considered a single unit. The unique paring of a wireless card (such as card 111) to the mother board allow for an integral connection that meets the FCC requirements, since the mother board has a unique coupling to antenna.

During design and manufacture of the transmission antennas, an antenna identifier (ID) is created that is unique to the specific antenna subsystem and computer system within which the antenna is to be embedded. This antenna ID is based on the antenna's size, shape, material, tuning and the size, shape, material of the surrounding composite. Further, this unique antenna ID is a function of the antenna and chassis only and not related to previously used identifiers for machine type models (i.e., CPU, segment, Series, etc).

Figure 3A:
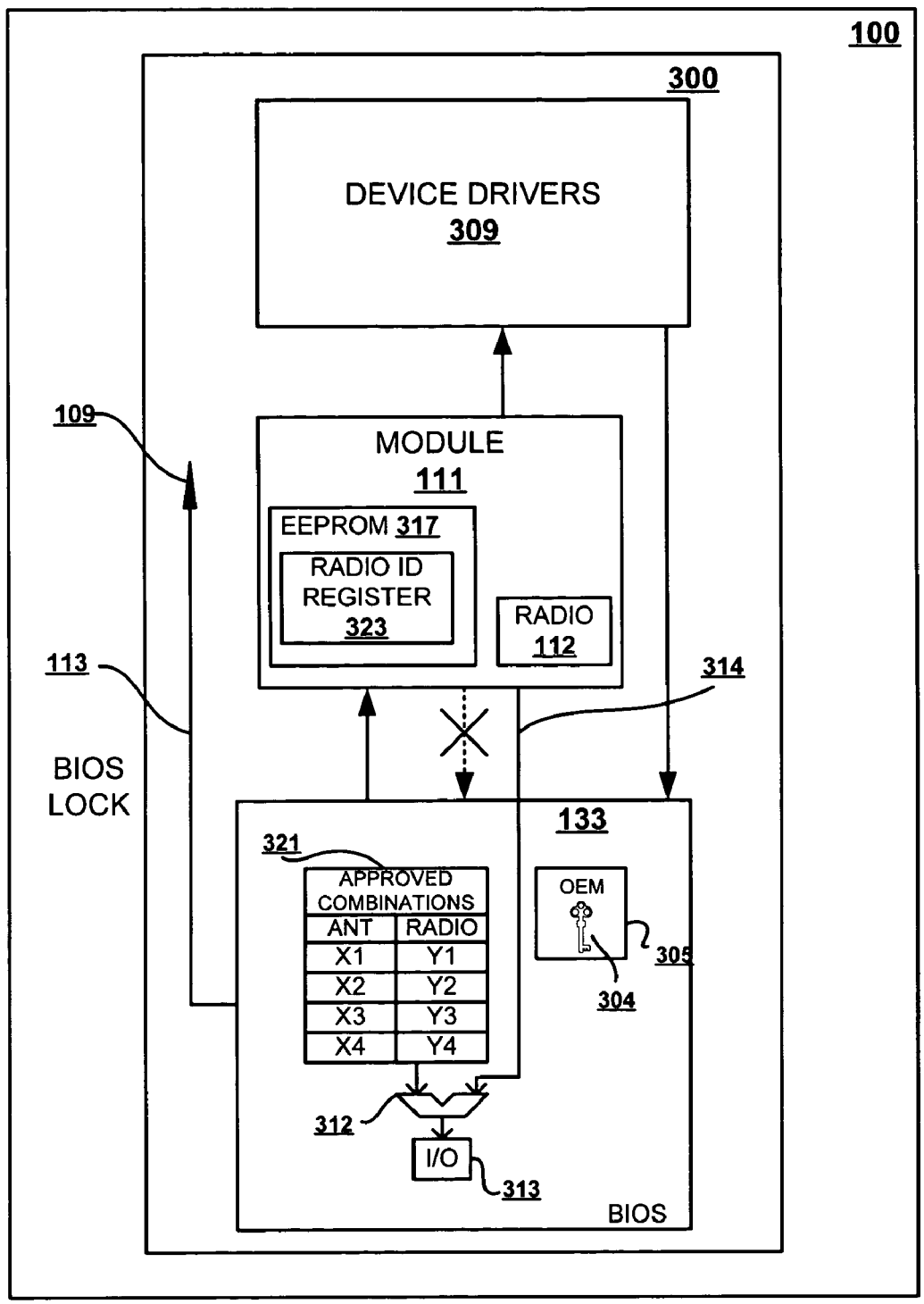
FIG. 3A depicts the system BIOS with wireless LAN adapter and device driver providing authentication of the wireless module according to one embodiment of the invention.

System BIOS Software-Authentication Mechanism for Integrally Coupling CRUable U-NII Wireless Radio and Embedded Antenna The invention provides a software-based mPCI radio-to-system/device authentication process. FIG. 3A illustrates several of the software and hardware components involved in completing the authentication process. The major blocks within the figure include blocks within the mother board 300 of computer system 100 and a wireless module 111, shown connected by a communication bus 314 (running from mPCI connector 114) across which signals/data are sent during the authentication process. Computer system 100 comprises coax connector 113 for antenna 109 embedded in the lid portion, device driver API 309, and BIOS 133. Wireless module 111 comprises the U-NII radio 112, and an EEPROM 317, which includes a register 323 in which is stored the radioID. The wireless module also comprises a wireless, local area network (wLAN) adapter (not shown) that enables wireless module to connect the computer system to a LAN.

The BIOS 133 is enhanced/extended with a mechanism to uniquely determine the antenna subsystem, which includes the antenna's size, shape, material, and tuning and the size, shape, and material of the surrounding composite. This provides a version of BIOS that is unique to the antenna and chassis only. Specifically, as illustrated, system BIOS 133 comprises an original equipment manufacturer (OEM) field 305, which provides a software key 304 to complete the authentication process, as described further below. Additionally, system BIOS 133 comprises a table 321 of approved antenna-radio combinations for that device's chassis. Specifically, the table 321 includes a listing of the approved Peripheral Component Interconnect (PCI) IDs for corresponding radio and antenna combinations that have been granted FCC authorization for operation. System BIOS 133 also comprises a comparator 312 and an approval flag 313, which holds the result of a comparison of radio PCI IDs as described below. The combinations of relevance to the implementation depends on the manufacture-established parameters of the antenna and chassis, and thus, in one embodiment, the approved combination list may be limited to only those radios that are approved for use with the particular antenna of the system.

Figure 3B:
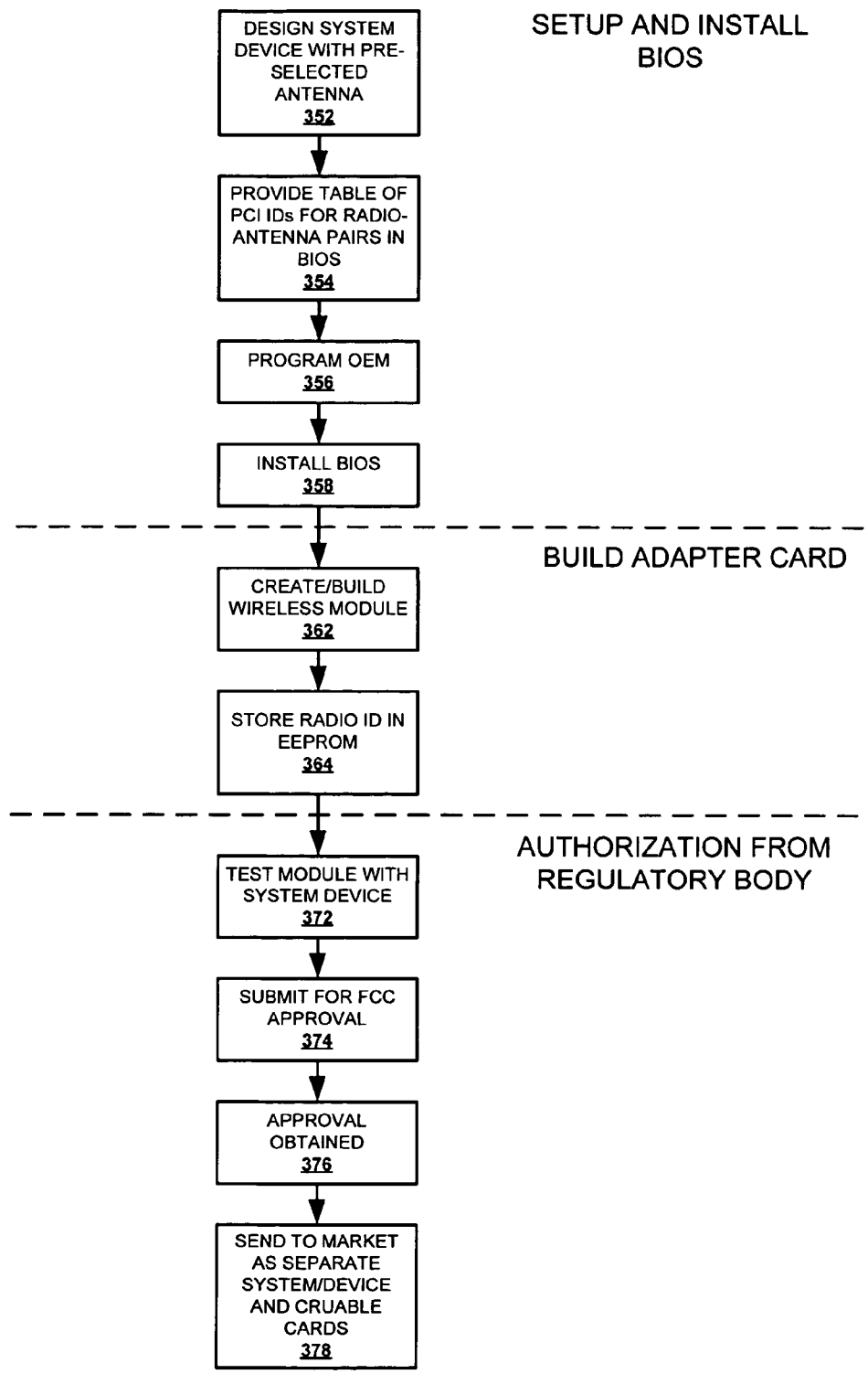
FIG. 3B is a flow chart illustrating the processes by which the device hardware and BIOS, etc. illustrated in the above figures are configured for operation according to the one embodiment of the invention.

In order to support/provide the features of the invention, the above system components and radio module are designed and/or programmed with specific parameters and functionality. FIG. 3B provides a flow chart of the steps involved in obtaining FCC approval for the components after designing and/or programming the components with parameters and functionality required for implementing the steps of the invention. The process may be divided into three stages, which are: (1) designing, configuring, and installation of the BIOS; (2) building the CRUable adapter card; and (3) obtaining authorization from the regulatory body. Although described as sequential stages, the stages may be completed out of the described order or in an overlapping manner.

The first stage begins with a manufacturer designing the system/device with a particular antenna both having pre-established operating parameters as shown at block 352. That is, in addition to the operating parameters of the antenna, other parameters related to the chassis of the device are also specified within the system design. The BIOS creator then generates and stores the table of approved radio-antenna PCI ID combinations for that chassis, as shown at block 354. The manufacturer/supplier receives the authorized pairings from the FCC either before or during the FCC authorization process based primarily on the antenna parameters. The manufacturer also programs the OEM with the correct encrypted key for the authorized radio as indicated at block 356. Following, the BIOS is installed on the system/device/machine during completion of the building of the mother board as indicated at block 358. An assumption is made that the manufacturer has loaded the correct BIOS based on the unique antenna type and device's chassis. This assumption is almost certain to be correct since failure of the manufacturer to provide the correct BIOS would result in unauthorized antennas and substantial financial penalties by the FCC.

Once the system/device has been designed with the BIOS programmed with the necessary functionality based on the antenna-system combination, the second stage of creating/building the wireless radio module is completed as shown at block 362. During the build process, logic is provided within the module to complete device-to-module authentication steps, etc., when the module is inserted within the system/device and power is supplied to the module. Following, the manufacturer or authorized supplier configures the module by programming the radioID in the EEPROM of the module, as shown at block 364. Because different types of CRUable radios may be utilized within the system/device depending on the approved authorized combinations, all CRUable radios designed for utilization with the particular system/device's chassis may be programmed with a same radioID rather than having multiple radioIDs that are each capable of receiving authorization during the BIOS authorization process. However, as will be explained later, only the correct model of radio is allowed to be opened within the device. The model number or other identifying characteristic of the authorized radio is stored in the OEM at step 356.

When a system/device and authorized module have been created, the combination is subjected to a series of tests as shown at block 372 to ensure the system/device complies with government regulations. Following the completion of these tests, the system/device is submitted to the regulatory body for approval as indicated at block 374, and the manufacturer waits for approval from the governing body. The cards are also tested and submitted for approval. Notably, manufacture of different cards and system/devices may also be submitted for approval from the government regulatory body. Government approval is thus obtained for all combinations of authorized radio module and system/device chassis and antenna, given the BIOS-authentication operation. After approval is obtained, as indcted at block 376, similarly configured and designed systems/devices and modules are sent to market as individual units for customer purchase as shown at block 378, and the authentication process that is built into the system/device and CRUable cards is triggered whenever the two units are coupled to each other and the system/device is powered up.

The functionality and operation of each of the components of FIG. 3A within the invention is described below with reference to the process flow of FIG. 4. To simplify the description of the process, only those components of FIG. 3A that are vital to an operation are indicated with a reference numeral in the following description of FIG. 4.

Figure 4:
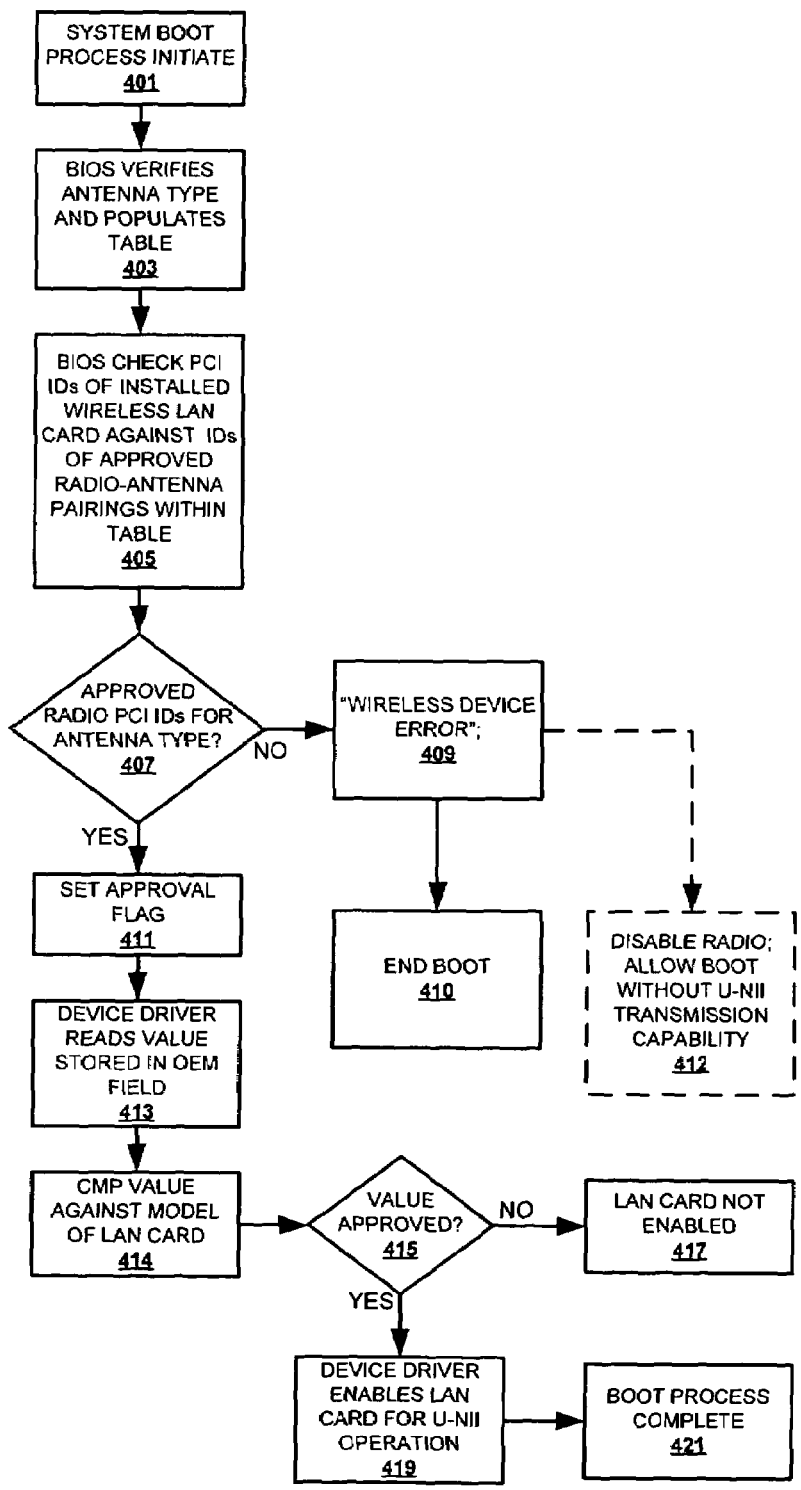
FIG. 4 is a flow chart of the process by which the BIOS-based authentication of an U-NII wireless module is completed in accordance with one embodiment of the invention.

Referring to the flow chart of FIG. 4, when the computer system is powered on, the boot process begins as shown at block 401. The system BIOS, which is unique to the device (and antenna type) verifies the antenna type and populates the table 321 with authorized combinations as indicated at block 403. Since the antenna type does not change in a system, and the antenna is provided by the manufacturer (or authorized service entities), the table may be pre-populated during system manufacture or authorized replacement of wireless components. This removes the second step of the process (block 403) following initiation of the boot-up procedure. Notably, the invention assumes that the manufacturer has loaded the correct BIOS based on the unique antenna type and device's chassis.

The BIOS then checks the PCI ID (or radioID) from the subsystem (EEPROM) of the wireless LAN card inserted into the system's wireless port against the PCI IDs of approved radio-antenna pairings within the table as shown at block 405. The check is completed by the comparator 312, which receives two inputs, a first PCI ID of the radio of the authorized radio-antenna pairing in the table 321 and a second PCI ID (or radioID) from the wireless LAN card. The comparator then compares the two PCI IDs with each other and makes a determination, indicated at block 407, whether the two PCI IDs match. The result of the comparison indicates whether the present combination of antenna subsystem and wireless LAN card is an approved/valid coupling by the FCC's integral standard. If the two PCI IDs do not match, indicating the wireless card's radio is not FCC-authorized to be coupled to the antenna of the system/device, an error message is generated as indicated at block 409. Then, in the primary embodiment, the boot process terminates as shown at block 410. In another embodiment, the radio is disabled, but the boot process is allowed to proceed as indicated at block 412. However, the system boots without U-NII transmission capability. When the combination is an FCC approved one, an approval flag is set as shown at block 411.

With the approval flag set, the boot process continues and, as shown at block 413, the device driver 309 makes a BIOS call to the OEM (original equipment manufacturer) field 305 for a pre-set value stored within the OEM 305. The OEM is a specific field within the BIOS that stores a value provided by the device manufacturer to identify the approved wireless card for that system/device and antenna. In one embodiment, the OEM stores the allowable card ID (e.g., the model number) for the authorized card. The value in the OEM field is encrypted prior to being stored by the manufacturer of the system or an authorized customizer of the system. The value is decrypted during the BIOS call by the device driver. Utilizing the card's model number, an secondary check is made at block 415 to determine whether the card installed is approved for the system/device, i.e., whether the wireless LAN card is approved for operation within that computer system. This determination involves decrypting the OEM value that is retrieved from the OEM field and comparing that decrypted value to a known/pre-authorized value (e.g., model number) for radios (or radio cards/modules) that can be used in the device. When the OEM value does not match one within the table or other location of authorized radio model numbers, the wireless LAN card is not enabled as indicated at block 417. The device driver disables the interface to the wireless LAN card. However, when the value is approved, the device driver enables the wireless LAN card for operation within the system as shown at block 419, and the boot process is allowed to complete as shown at block 421.

In one embodiment, the process of determining during system operation that the radio has been authenticated involves utilization of the approval flag and OEM field. The result of the comparison is stored within the approval flag, which may be a single bit register storing a 1 or 0, respectively indicating authorized and un-authorized coupling. When a request for U-NII transmission is received on the system, the BIOS checks the output register for the stored indication and the OEM value against the model number of the radio before completing the U-NII connection from the system. Thus, a request for U-NII connection is allowed to proceed only when both checks return positive results. Also, the output register is cleared (reset to 0) whenever a triggering condition is registered on the device. The triggering condition may be one of several conditions from among reboot of the system, removal of the wireless module, registering a break in the wired connection between the antenna and the radio, modification/replacement of the radio, and modification/replacement of said antenna, etc. With this implementation, the wireless LAN card is disabled by default, and the Device Driver will not enable the card to for use with the antenna if the card is not installed in a system where the antenna paring with the radio is an FCC approved combination. The FCC's unique coupling requirement for integral transmitters is thus satisfied using software-implemented authentication of CRUable wireless modules within computer systems designed to support U-NII wireless transmissions.

The two-step authentication mechanism ensures that the system will not complete a bootup unless an authorized combination of wireless module/radio and antenna within a specific chassis is doubly confirmed. An false authentication from the BIOS table comparison is negated by the OEM check. Also, as indicated by block 412, the computer system may be allowed to boot-up but with the wireless capabilities completely disabled. Further, other built in checks of the invention may cause the computer system to automatically shut down if the user attempts to connect using an unauthorized radio (i.e., a radio that has not been authenticated by the above processes) during system operation. Additional safeguards are thus provided by the invention.

With this implementation, the boot process may complete on the system, but no wireless access is permitted and the wireless LAN card is inoperative within that system. Additional considerations for this implementation include: (1) The BIOS lock process may be utilized along with the above process to ensure that the system will only boot with authorized cards; (2) The Device Drivers that recognize the manufacturer's mPCI cards should include logic for the "Allowable Card ID." That is, the device driver is designed to only allow the inserted card to work (or become operational) in certain systems to which the cards match. Systems are thus designed with specific device drivers that look for pre-specified, unique cards and only accept those cards; and (3) The radio is disabled until enabled by the Device Driver.

OVERVIEW

This implementation of the invention provides several advantages over other solutions. Among these advantages are:

(1) The implementation has no dependency on hardware, including the computer system and the card; The implementation is easily implemented only with system management (SM) BIOS and Device Driver and can easily be checked in real time during each power-up and/or resume process;

(2) The implementation is less complex in that it does not require an additional Validation Utility Software (described below). Firstly the solutions work with standard or legacy hardware. Both other implementations require creation and maintenance of additional software, such as Validation Utility;

(3) Further, the solutions may be defined as industry standard methods to be implemented across systems and cards; and (4) Lastly, updates to the allowable cards are handled only through manufacturer-specific BIOS, thus substantially eliminating the possibility of an unauthorized tampering of the approval mechanism.

Current solutions for U-NII enabled systems utilize tamper proof screws to prevent the removal of the radio by unauthorized personnel. For PCMCIA (personal computer memory card international adapter) cards, the antenna is soldered to the radio and is a single unit, and this prevents un-intentional removal of the radio. The various implementations and/or embodiments of the present invention enables a manufacturer to offer wireless ready systems for U-NII (5 Ghz band). Further the invention allows for after-market purchase of a radio that satisfied the FCC requirements, thus enabling users the flexibility of deciding whether to invest in the more expensive U-NII devices. The invention also results in significant cost savings to the manufacturer, since the U-NII products are CRUable, i.e., customers can install, exchange, or replace the radio, rather than requiring the radio to be serviced by an authorized service center. This solution also provides a significant improvement in manufacturing, since it does not require tamper proof designs.

While the invention has been described with specific reference to portable computers and/or laptop computers, the features of the invention are not limited to such devices. Those skilled in the art appreciate that the features of the invention may be extended to any device utilizing wireless transmitters, including desktop computers that are built with embedded antennas and a slot for receiving a wireless card, and any portable electronic device with similar wireless transmission capabilities and components.

Also, it is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. In a device having an embedded antenna designed for supporting wireless communication via the U-NII wireless protocol, a basic input/output system (BIOS), and an interface for electrically coupling a CRUable U-NII radio, a method for providing an authorized U-NII transmitter within the device, said method comprising:

detecting at the interface an electrical coupling to a CRUable mPCI card containing a U-NI-standard radio having an associated radio PCI ID and other identifying characteristic;

comparing the radio's PCI ID with a second radio PCI ID obtained from a table of radio-antenna PCI ID pairs corresponding to authorized U-NII radio-antenna combinations, wherein said table is provided within the BIOS of the device and said second radio PCI ID is selected by matching the antenna ID of the embedded antenna with a similar antenna ID within the table; and enabling U-NII transmission via the combination of the radio and the antenna only when said radio IDs match, indicating an approved combination of said radio and said embedded antenna;

wherein, when the radio IDs do not match, said method further comprises preventing the use of the radio with the antenna.

2. The method of claim 1, said comparing step further comprising:

following a power on of said device, initiating a BIOS check of system components, wherein the radio ID is read from the CRUable U-NII radio that is also electrically coupled to said BIOS;

populating the table within system BIOS with authorized antenna-radio 11) pairs for that device;

retrieving the antenna ID from a storage location within said BIOS;

reading a first radio ID from the table within the BIOS, wherein said radio PCI ID read is one stored as a paired entry in said table with the retrieved antenna ID of the embedded antenna;

comparing a pairing of said radio ID and said antenna ID against the table of approved radio/antenna ID pairs, wherein the radio IDs are compared once the retrieved antenna ID is located within the table.

3. The method of claim 2, further comprising terminating said boot up when said comparison indicates the radio's ID does not match one within the table of approved radio-antenna ID pairs selected by matching the antenna ID.

4. The method of claim 1, said authentication process further comprising:

retrieving a secret key from an OEM field within said BIOS, said secret key being an allowable card ID for that device, which is encrypted and stored in said OEM field by a manufacturer of said device;

decrypting said secret key;

comparing said secret key against card IDs within the table matching the ID of the CRUable U-NII radio card; and enabling said radio to operate within said device only when said secret key matches the card ID, wherein U-NII transmission via the radio-antenna combination is enabled only when said radio-antenna ID pairing matches one of said approved radio/antenna ID pairs within the table and said secret key matches the ID of the connected radio card.

5. The method of claim 4, wherein said secret key is a model number of approved cards for operation within the device and said model number is associated with the radio PCI ID within the table.

6. The method of claim 1, wherein said comparing further comprises:

comparing the radio's PCI ID with a second radio PCI ID for a match;

when a match is found, storing an indication of said match of radio IDs within an approval flag; checking said an approval flag prior to completing an U-NII connection with said device, wherein a request for U-NII connection is allowed to proceed only when said approval flag indicates the radio has been authenticated; and clearing said approval flag whenever a triggering condition is registered on the device, said triggering condition being a condition form among rebooting the device, removing the wireless module, breaking a connection between said antenna and said radio, modification/replacement of said radio, modification/replacement of said antenna.

7. The method of claim 3, wherein said device is a portable computer system.

8. A method comprising:

receiving a CRUable U-NII radio card into an interface slot within a wireless ready device designed for receiving radio cards, said radio card having a radio with a radio identification (ID) parameter, wherein said slot enables said radio to be electrically coupled to and interface with an antenna that is embedded in the device and has an antenna identification (ID) parameter;

during boot up of the device, completing an authentication process utilizing a table within a BIOS of the device of paired radio-antenna IDs for authorized radio-antenna combinations, wherein the authentication process verifies that said radio is an authorized radio for utilization with the antenna within the device under U-NII standards; and when said authentication process verifies that said radio is authorized, completing a boot of said device and enabling U-NII communication via the combination of said antenna and said radio, wherein a U-NII transmitter meeting an "integral" requirement is provided within the wireless ready device having the embedded antenna;

wherein, when the authentication process fails to verify that the radio is authorize, completing the boot, and prevention the use of the radio with the antenna, such that a breach of the integral requirement is not enabled.

9. The method of claim 8, wherein:

said CRUable U-NII radio is fabricated on a wireless module that also comprises a register holding the radio ID and an interface for connecting to said interface slot of said device;

said device comprises the antenna, the interface slot, a coax connector slot and coax coupling the connector slot to said antenna, a basic input/output system (BIOS) with a table of approved radio-antenna pairings and an OEM field with a secret key programmed by a manufacturer; and said step for completing an authentication process completes a radio-to-antenna and a radio-to-device authentication process, wherein only a correct radio model is enabled.

10. The method of claim 8, said authentication process further comprising:

following a power on of said device, initiating a BIOS check of system components, wherein the radio ID is read from the CRUable U-NII radio that is also electrically coupled to said BIOS;

populating the table within system BIOS with authorized antenna-radio ID pairs for that device;

retrieving the antenna ID from a storage location within said BIOS;

reading a first radio ID from the table within the BIOS, wherein said radio PCI ID read is one stored as a paired entry in said table with the retrieved antenna ID of the embedded antenna;

comparing a pairing of said radio ID and said antenna ID against the table of approved radio/antenna ID pairs, wherein the radio IDs are compared once the retrieved antenna ID is located within the table.

11. The method of claim 8, said authentication process further comprising:

retrieving a secret key from an OEM field within said BIOS, said secret key being an allowable card ID for that device, which is encrypted and stored in said OEM field by a manufacturer of said device;

decrypting said secret key;

comparing said secret key against card IDs within the table matching the ID of the CRUable U-NII radio card; and enabling said radio to operate within said device only when said secret key matches the card ID, wherein U-NII transmission via the radio-antenna combination is enabled only when said radio-antenna ID pairing matches one of said approved radio/antenna ID pairs within the table and said secret key matches the ID of the connected radio card.

12. The method of claim 11, said comparing step comprises comparing said secret key to a radio ID within said table within the BIOS.

13. The method of claim 9, wherein said radio ID and said antenna ID are peripheral component interconnect (PCI) identifications (IDs).

14. The method of claim 10, further comprising:

when said first radio ID and said second radio ID matches, allowing a boot process being executed on the device to complete, wherein when said match does not occur, said boot process is terminated.

15. The method of claim 10, further comprising:

when said first radio ID and said second radio ID does not match, disabling said radio from operating within said device, wherein said device is booted without U-NII transmission capability.

16. The method of claim 11, wherein said secret key authentication is completed proximate in time to said comparison of radio PCI ID pairs, whereby a dual authentication process is completed to activate said radio for U-NII operation within the device.

17. The method of claim 8, wherein said completing an authentication process further comprises:

comparing a pairing of said radio ID and said antenna ID against the table of approved radio/antenna ID pairs for a match;

when a match is found, storing an indication of said match within an approval flag;

checking said approval flag for said indication prior to completing a U-NII connection from said device, wherein a request for U-NII connection is allowed to proceed only when said approval flag indicates that U-NII connection is authorized and said secret key matches the card ID; and clearing said approval flag whenever a triggering condition is registered on the device, said triggering condition being a condition form among rebooting the device, removing the wireless module, breaking a connection between said antenna and said radio, modification/replacement of said radio, modification/replacement of said antenna.

18. A wireless-ready device comprising:

an embedded antenna having an antenna ID and specific design characteristics to enable U-NII transmission when coupled to an authorized U-NII radio;

an interface which receives a CRUable U-NII radio card with a radio having a radio ID, wherein said interface enables said radio to be electrically coupled to and interface with the embedded antenna;

a BIOS that comprises an OEM field and a table of radio ID and antenna ID pairs for authorized U-NII radio-antenna combinations, said OEM field storing an encrypted allowable card ID;

an authentication mechanism associated with said BIOS that initiates a radio-to-device verification process during boot up of the device that verifies that said radio is an authorized radio for utilization with the embedded antenna and within said device according to pre-established U-NII standards; and U-NII transmitter activation logic that, when said verification process verifies that said radio is authorized for utilization with said antenna and within said device, for completing a boot of said device and enabling U-NII communication via the combination of said antenna and said radio, wherein a U-NII transmitter meeting an "integral" requirement is provided within the wireless ready device;

wherein, when the verification process fails to verify that the radio is authorized for utilization with said antenna and for utilization within the device, said activation logic enables completion of the boot of the device, and prevents use of the radio with the antenna, such that a breach of the integral requirement is not enabled.

19. The device of claim 18, wherein:

said CRUable U-NII radio is fabricated on a wireless module that also comprises a register holding the radio ID and an interface for connecting to said interface slot of said device;

said device comprises the antenna, the interface slot, a coax connector slot and coax coupling the connector slot to said antenna, a basic input/output system (BIOS) with a table of approved radio-antenna pairings and an OEM field with a secret key programmed by a manufacturer; and said authentication mechanism provides both radio-to-antenna authentication and radio-to-device authentication, such that only an authorized radio within an approved device is enabled.

20. The device of claim 19, wherein said BIOS further comprising:

activation code, which initiates a BIOS check of system components following a power on of said device, wherein the radio ID is read from the CRUable U-NII radio that is also electrically coupled to said BIOS;

authentication code that:

(1) populates the table within system BIOS with authorized antenna-radio ID pairs for that device;

(2) retrieves the antenna ID from a storage location within said BIOS; and (3) reads a first radio ID from the table within the BIOS, wherein said radio ID read is one stored as a paired entry in said table with the retrieved antenna ID of the embedded antenna;

a comparator that compares a pairing of said radio ID and said antenna ID against the table of approved radio/antenna ID pairs, wherein the radio IDs are compared once the retrieved antenna ID is located within the table; and a verification mechanism that, when said first PCI ID and said second PCI ID matches, signals an approval of said radio-to-device authentication as a successful authentication of said radio for operation within said device.

21. The device of claim 19, further comprising:
a device driver that controls access to and from said radio card, and which completes a radio-to-device authentication by:
retrieving a secret key from an OEM field within said BIOS said secret key being an allowable card ID for that device, which is encrypted and stored in said OEM field by a manufacturer of said device;
decrypting said secret key;
comparing said secret key against card IDs within the table matching the ID of the CRUable U-NII radio card; and
enabling said radio to operate within said device only when said secret key matches the card ID, wherein U-NII transmission via the radio-antenna combination is enabled only when said radio-antenna ID pairing matches one of said approved radio/antenna ID pairs within the table and said secret key matches the ID of the connected radio card.

22. The device of claim 20, further comprising:
boot termination mechanism that allows a boot process being executed on the device to complete when said first radio ID and said second radio ID matches, wherein when said match does not occur, said boot termination mechanism terminates said boot process.

23. The device of claim 20, further comprising:
a transmission disabling mechanism that disables said radio from operating within said device when said first radio ID and said second radio ID does not match or said secret key does not match the card ID, wherein said device is booted without U-NII transmission capability.

24. The device of claim 21, wherein said device driver comprises a transmission disabling mechanism that disables said radio from operating within said device when said first PCI ID and said second PCI ID do not match or said secret key does not match said card ID, wherein said device is booted without U-NII transmission capability.

25. The device of claim 18, further comprising:
means for comparing the first radio ID with a second radio ID for a match when an antenna ID of the respective first radio ID and the second radio ID also matches;
when a match is found, a validation register that stores a result of the comparison of the radio IDs;
means for checking said validation register for said result prior to completing a U-NII connection with said device, wherein a request for U-NII connection is allowed to proceed only when said result indicates a match between said radio IDs; and
reset mechanism for resetting a value of said validation register whenever a triggering condition is registered on the device, said triggering condition being a condition from among rebooting the device, removing the wireless module, breaking a connection between said antenna and said radio, modification/replacement of said radio, modification/replacement of said antenna.

* * * * *